(12) United States Patent
Komatsu et al.

(10) Patent No.: US 6,344,427 B1
(45) Date of Patent: Feb. 5, 2002

(54) DIELECTRIC CERAMIC COMPOSITION, CAPACITOR USING THIS AND PRODUCTION METHOD THEREOF

(75) Inventors: Kazuhiro Komatsu, Chitose; Atsuo Nagai, Hirakata; Keiji Kobayashi, Kawachinagano; Hideki Kuramitsu, Hirakata, all of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/673,513
(22) PCT Filed: Feb. 16, 2000
(86) PCT No.: PCT/JP00/00844
  § 371 Date: Nov. 29, 2000
  § 102(e) Date: Nov. 29, 2000
(87) PCT Pub. No.: WO00/48963
  PCT Pub. Date: Aug. 24, 2000

(30) Foreign Application Priority Data

Feb. 19, 1999 (JP) .................................. 11-041202

(51) Int. Cl.[7] .................. C04B 34/468; H01G 4/06
(52) U.S. Cl. .................. 501/138; 501/139; 361/321.2; 361/321.3; 361/321.4; 361/321.5; 438/396
(58) Field of Search .................. 501/138, 139; 361/321.2, 321.3, 321.4, 321.5; 438/396

(56) References Cited

U.S. PATENT DOCUMENTS 6,058,005 A * 5/2000 Matoba et al. ........... 361/321.4
6,291,380 B1 * 9/2001 Yokoi et al. ................ 501/138

* cited by examiner

Primary Examiner—David Brunsman
(74) Attorney, Agent, or Firm—Parkhurst & Wendel, L.L.P.

(57) ABSTRACT

A dielectric ceramic composition of the present invention is a mixture of barium titanate as a main component whose Ba/Ti molar ratio ranging from 1.001 to 1.05 and sub components comprising, at least 0.5 to 5.0 mol of Mg in the form of MgO, 0.1 to 3.0 mol of Dy in the form of $Dy_2O_3$, 0.01 to 0.4 mol of Mn in the form of $Mn_3O_4$, 0.01 to 0.26 mol of V in the form of $V_2O_5$, 0.3 to 3.5 mol of Si in the form of $SiO_2$ and 0.01 to 3.0 mol of Al in the form of $Al_2O_3$ per 100 mol of the barium titanate. Even when external electrodes are made of base metal such as copper or the like, a multilayer capacitor whose dielectric layers are not reduced and have high insulation resistance can be obtained by using the dielectric ceramic composition of the present invention.

15 Claims, 1 Drawing Sheet his is a 371 of PCT/JP00/00844 filed Feb. 16, 2000.

DIELECTRIC CERAMIC COMPOSITION, CAPACITOR USING THIS AND PRODUCTION METHOD THEREOF

This is a 371 of PCT/JP00/00844 filed Feb. 16, 2000.

TECHNICAL FIELD

The present invention relates to a dielectric ceramic composition to be used for dielectric layers of a multilayer ceramic capacitor having internal electrode layers composed of base metal such as nickel or the like, a capacitor using the same and a method of manufacturing the capacitor.

BACKGROUND ART

A conventional multilayer ceramic capacitor such as disclosed in Japanese Patent Laid-Open Publication No. 8-337471 (1996) is such that dielectric layers and internal electrode layers of nickel are alternately stacked, and sintered in an inert atmosphere or in a reducing atmosphere, and external electrodes are formed with silver or the like thereafter. The above-mentioned dielectric layers contain, as a main component, $BaTiO_3$ in which rare earth oxide(s) such as $Dy_2O_3$ and the like and $Co_2O_3$ are contained, and contain BaO, MnO, MgO, $Al_2O_3$ and oxide glass mainly composed of $Li_2O$—(Si, Ti)—$Al_2O_3$ as sub components.

Generally, nickel and silver do not dissolve in each other. Accordingly, electrically connect the internal electrodes and the external electrodes without fail, it is preferable to form the external electrodes with, for example, copper or the like, a metal which dissolves completely in silver. However, to form with copper, the external electrodes should be formed in a non-oxidizing atmosphere. In the case of dielectric layers having the above-mentioned composition, the components of the dielectric layers are problematically reduced during formation of the external electrodes, and insulation resistance of the dielectric layers lowers accordingly.

Generally, in the case of manufacturing a multilayer capacitor using a dielectric ceramic composition mainly composed of barium titanate, when a molar ratio of Ba/Ti is less than 1, $TiO_2$ is apt to be reduced during the sintering process in the reducing atmosphere, or while organic binders contained in the dielectric layers are burned. Although the reduced $TiO_2$ is re-oxidized in some degree during a cooling process after sintering, the inside of each of the dielectric layers and the inside of each crystal grain resist being re-oxidized, and remain deficient in oxygen. As a result, the insulation resistance and dielectric breakdown voltage of the dielectric layers degrade.

DISCLOSURE OF THE INVENTION

An object of the present invention is to provide a dielectric ceramic composition enabling obtainment of a multilayer capacitor whose dielectric layers are not reduced, and have high insulation resistance even if external electrodes are formed of base metal such as copper or the like, a capacitor using this composition and a method of manufacturing the capacitor.

The dielectric ceramic composition of the present invention contains barium titanate as a main component, and contains at least 0.5 to 5.0 mol of Mg in the form of MgO, 0.1 to 3.0 mol of Dy in the form of $Dy_2O_3$, 0.01 to 0.4 mol of Mn in the form of $MnO_{4/3}$, 0.01 to 0.26 mol of V in the form of $V_2O_5$, 0.3 to 3.5 mol of Si in the form of $SiO_2$ and 0.01 to 3.0 mol of Al in the form of $Al_2O_3$ as sub components per 100 mol of the barium titanate, and is characterized in that a molar ratio of Ba/Ti ranges between 1.001 and 1.05.

The dielectric ceramic composition of the present invention compensates oxygen defect occurring during sintering with making the Ba/Ti molar ratio ranging between 1.001 and 1.05, the molar ratio which is made to be larger than 1, and with cation holes each being caused by substituting a part of Ti having a valence of four with V having a valence of five. As a result, reduction of $TiO_2$ and decrease in insulation resistance of the dielectric ceramic composition can be prevented.

BEST MODES FOR CARRYING OUT THE INVENTION

EXAMPLE 1

Figure 1:
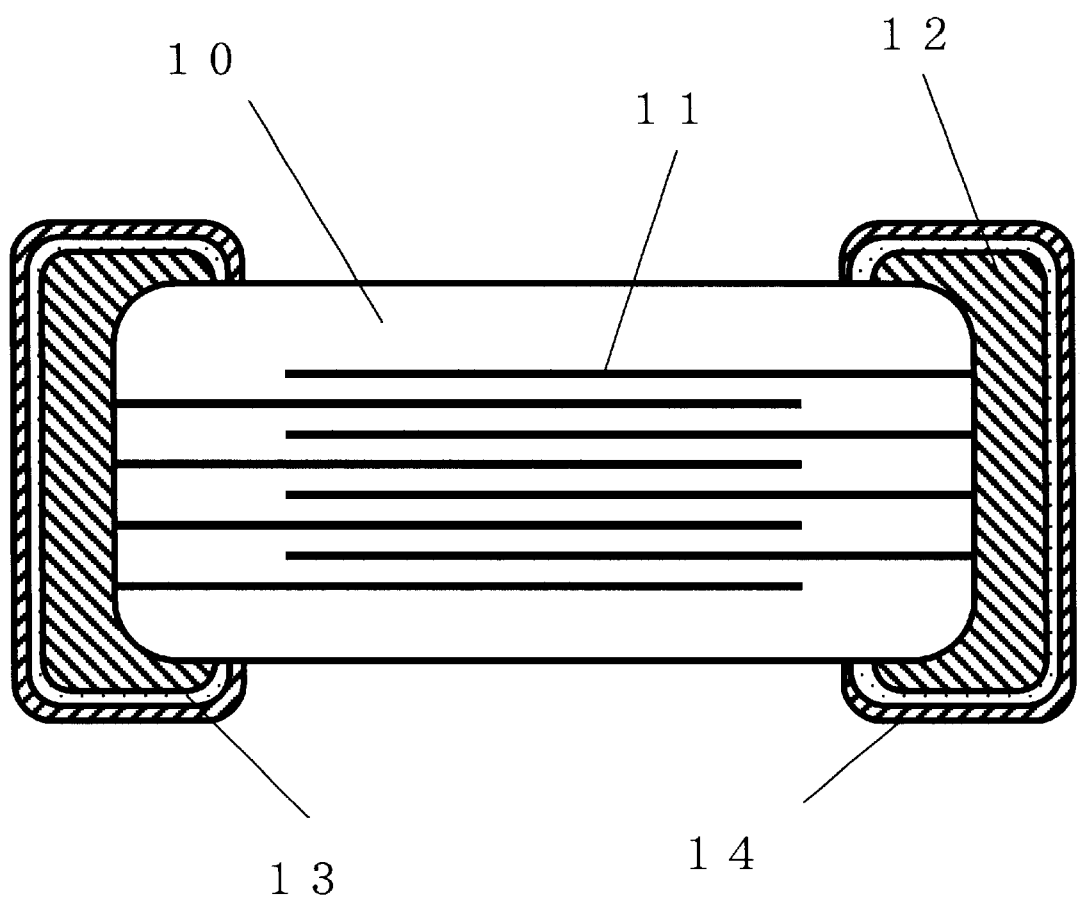
FIG. 1 is a sectional view of a multilayer capacitor in accordance with an exemplary embodiment of the present invention.

A first example of the present invention will be explained hereinafter with reference to FIG. 1.

First, barium titanate shown in Table 1 was prepared. It should be noted that asterisks (*) in Table 1 denote compositions of comparative examples.

100 mol of the barium titanate were mixed with 0.02 mol of $BaCO_3$, 1.0 mol of $Dy_2O_3$, 2.5 mol of MgO, 0.2 mol of $MnO_{4/3}$, 0.15 mol of $V_2O_5$, and 2.1 mol of BaO—$SiO_2$—$Al_2O_3$-base glass, and pure water was then added thereto. The mixture was subsequently subjected to wet mixing in a ball mill with zirconia balls as media for 17 hours, and then ground. Thereafter, the thus-mixed and ground composition were dried.

Next, the thus-mixed materials were milled, put in an alumina crucible, and calcined at a temperature of 1100° C. for 2 hours. This calcination is carried out at such a temperature that metal carbonate decomposes, and the barium titanate as the main component and the sub components moderately react with each other.

Subsequently, the above calcined materials were being subjected to wet milling in a ball mill so that their mean particle diameter becomes 1.0 μm or less, followed by a drying to become dielectric materials.

Thereafter, polyvinyl butylal resin as a binder, n-butyl acetate as a solvent, and dibutyl phthalate as a plasticizer were added to the dielectric materials, and all of these materials were mixed with zirconia balls in a ball mill for 72 making a slurry.

This slurry was then made into a ceramic sheet by the doctor blade method. This ceramic sheet had a thickness of 14 μm after being sintered. The sheet became dielectric layer 10 of a capacitor, as described later.

Next, internal electrode paste mainly comprising nickel was screen-printed on the surface of the ceramic sheet, and then dried, to form an internal electrode material layer. Next, ten ceramic sheets each formed with the internal electrode material layer, were stacked, subjected to a heat pressing, and then cut into a laminated body of 3.3 mm long and 1.7 mm wide.

Thereafter, the laminated body was placed in an alumina sintering vessel, and organic substances were then burned out in an atmosphere selected not to excessively oxidize nickel. Subsequently, the temperature was raised, and the laminated body was sintered in a reducing atmosphere constituted by mixing nitrogen, hydrogen and carbon dioxide or water vapor at a maximum temperature ranging from 1220 to 1340° C. for 2 hours. The sintering atmosphere allows dielectric layers 10 to sinter, while not excessively oxidize nickel. The sintered body was then heated during a process of lowering temperature in a reducing atmosphere constituted by using nitrogen, hydrogen and carbon dioxide or water vapor at a temperature ranging from 800 to 1200° C. for 1 hour, and dielectric layers 10 thus reduced during sintering were re-oxidized. Here, the reducing atmosphere is such that nickel is not excessively oxidized. Thereafter, the sintered body was cooled to room temperature.

The sintering temperature is set at the temperature at which the density of the sintered body of dielectric layers 10 becomes the greatest according to respective dielectric material compositions.

Next, the surface of the thus-obtained sintered body was ground, and external electrode paste, mainly composed of copper was so applied to electrically connect to internal electrodes 11 exposed at end faces of the sintered body. Subsequently, the paste was fired at 850° C. for 15 minutes in an atmosphere of nitrogen mixed with oxygen, in such a quantity that copper is not excessively oxidized, thus forming external electrodes 12.

Thereafter, the surface of each external electrode 12 was formed with as nickel layer 13, followed by a solder layer 14, thus completing a multilayer capacitor, like that of FIG. 1.

A dielectric constant calculated from capacitance at 20° C. (room temperature) at a frequency of 1 KHz, a dielectric dissipation factor (tan δ) and rates of change between –55° C. and 125° C. relative to the capacitance at 20° C. were measured for the thus-obtained capacitor. The results are shown in Table 2. In addition, insulation resistance (IR) measured when a DC voltage of 25 V is applied at room temperature and a degradation status of insulation resistance (IR degraded to a value of $1 \times 10^7 \Omega$ or lower were counted and listed in Table 2) after a DC voltage of 200 V is applied for 250 hours at a temperature of 125° C. for an accelerated life test are also shown in Table 2.

As is clear from Table 2, each capacitor of the present invention shows a high dielectric constant which is 2000 or higher for initial performance and high insulation resistance of $1 \times 10^{12} \Omega$ or higher, and no degradation of insulating properties is found after the life test.

However, as shown in the comparative example of Specimen No. 1, when a molar ratio of Ba/Ti is smaller than 1.001, sufficient insulation resistance cannot be obtained. This is because dielectric layers 10, which are re-oxidized when the laminated body is sintered, are reduced again during formation of external electrodes 12. Moreover, as shown in the comparative example of Specimen No. 13, when the molar ratio of Ba/Ti exceeds 1.05, dielectric layers 10 do not sinter enough, and consequently insulating properties cannot be ensured.

Accordingly, as seen from the present embodiment, when the Ba/Ti molar ratio ranges between 1.001 and 1.05, dielectric layers 10 are not reduced during formation of external electrodes 12, thus providing a multilayer capacitor having a high insulation resistance and negligible degradation of insulating properties in the life.

Furthermore, an influence of a specific surface area of the barium titanate to be used was studied. As a result, a rate of change of the dielectric constant due to the temperature tended to increase at high temperature when the specific surface area was smaller than 2 m²/g, while the dielectric constant of dielectric layers 10 tended to decrease when the specific surface area exceeded 5 m²/g.

Accordingly, it is preferable to use barium titanate whose specific surface area ranges from 2 to 5 m²/g.

Moreover, barium titanate whose X-ray diffraction angle 2Θ at an angle of from 40 to 50° is not split into a peak derived from (002) plane and a peak derived from (200) plane (i.e. no split peaks) tends to have a larger rate of capacitance change at high temperature.

Accordingly, it is preferable to use barium titanate whose X-ray diffraction angle 2Θ at an angle of from 40 to 50° is split into a peak derived from (002) plane and a peak derived from (200) plane.

EXAMPLE 2

First, 100 mol of barium titanate was mixed with $BaCO_3$, $Dy_2O_3$, $MgO_2$, $MnO_{4/3}$, $V_2O_5$ and $BaO-SiO_2-Al_2O_3$-base glass in the respective quantities shown in Table 3, and pure water was then added thereto. The mixture was subsequently subjected to wet grinding in a ball mill with zirconia balls as media for 17 hours, and dried, and resultant mixed materials were produced.

Here, barium titanate having a Ba/Ti molar ratio of 1.000, a specific surface area of 3.3m²/g and an X-ray diffraction angle 2Θ which is split into a peak derived from (002) plane and a peak derived from (200) plane at an angle of from 40 to 50° was used.

Next, a multilayer capacitor, like the one shown in FIG. 1, was made from the mixed materials in the same manner as in the first exemplary embodiment.

Thereafter, a dielectric constant calculated from capacitance at 20° C. (room temperature) at a freguency of 1 KHz, a dielectric dissipation factor (tan δ) and rates of change between –55° C. and 125° C. relative to the capacitance at 20° C. were measured for the capacitor. The results are shown in Table 4. In addition, insulation resistance (IR) measured when a DC voltage of 25 V is applied at room temperature and a degradation status of insulation resistance (IR degraded to a value of $1 \times 10^7 \Omega$ or lower were counted and listed in table 4) after a DC voltage of 200 V is applied for 250 hours at a temperature of 125° C. are also shown in Table 4.

As is clear from Table 4, each capacitor of the present invention shows a high dielectric constant which is 2000 or higher for initial performance and high insulation resistance of $1 \times 10^{12} \Omega$ or higher, and no degradation of insulating properties is found after the accelerated life test.

In the present embodiment, the addition of MgO improves sintering properties and insulation resistance of dielectric layers 10. However, as can be seen from Table 3 and Table 4, insufficient sintering occurs when the quantity of MgO to be added is less than 0.5 mol, while the rate of capacitance change due to the temperature, increases when the MgO quantity exceeds 5.0 mol. Accordingly, it is preferable to add 0.5 to 5.0 mol of Mg, in the form of MgO, to 100 mol of the barium titanate.

Moreover, the addition of $Dy_2O_3$ prevents reduction of $TiO_2$, improves insulation resistance and satisfies electric characteristics, such as a temperature characteristic of the capacitance, tan δ and the like. However, as can be seen from Table 3 and Table 4, when the quantity of $Dy_2O_3$ to be added is less than 0.1 mol, the rate of capacitance change due to the temperature and the tan 67 increase. When the quantity of $Dy_2O_3$ to be added exceeds 3.0 mol, the dielectric constant drops to 2000 or lower, which is not good for practical use. Accordingly, it is preferable to add 0.1 to 3.0 mol of Dy in the form of $Dy_2O_3$ to 100 mol of the barium titanate. In addition, by using $Dy_2O_3$ whose specific surface area ranges from 7 to $15m^2/g$, dispersibility improves, and the above-mentioned effects become more noticeable.

Furthermore, the addition of $MnO_{4/3}$ prevents reduction of $TiO_2$. Additionally, even if a great number of laminated bodies are sintered in the inert atmosphere or in the reducing atmosphere, the addition of $MnO_{4/3}$ prevents degradation of insulation resistance, inhibits variations in the capacitance, and obtains homogeneous sintered bodies. However, when the quantity of $MnO_{4/3}$ to be added is less than 0.01 mol, the sintered body partially becomes semi-conductive, the insulation resistance lowers accordingly, and degradation of the insulation resistance to a large degree occurs in the accelerated life test. When the quantity of $MnO_{4/3}$ to be added exceeds 0.4 mol, the rate of capacitance change due to the temperature and due to the test period increases, and the degradation of the insulation resistance increases. Accordingly, it is preferable to add 0.01 to 0.4 mol of Mn, in the form of $MnO_{4/3}$ to 100 mol of the barium titanate.

Moreover, the addition of $V_2O_5$ inhibits reduction of $TiO^2$, increases insulation resistance, and prevents degradation of the insulation resistance. However, when the quantity of $V_2O_5$ to be added exceeds 0.26 mol, the rate of capacitance change due to the temperature increases, and the degradation of the insulation resistance occurs. When the quantity of $V_2O_5$ to be added is less than 0.01 mol, in addition to the low insulation resistance, the insulation resistance degrades in the accelerated test. Accordingly, it is preferable to add 0.01 to 0.26 mol of V to 100 mol of the barium titanate.

The addition of $BaO$—$SiO_2$—$Al_2O_3$-base glass accelerates sintering of dielectric layers 10 during sintering at a relatively low temperature and decreases variations in capacitance and in insulation resistance. However, when the quantity of the glass to be added is less than 0.6 mol, sintering of dielectric layers 10 becomes insufficient. When the glass quantity exceeds 5.0 mol, sintering properties of dielectric layers 10 improve, whereas the dielectric constant decreases, and the rate of capacitance changes due to the temperature increases, an impractical situation. Accordingly, it is preferable to add, per 100 mol of the barium titanate, 0.6 to 5.0 mol of $BaO$—$SiO_2$—$Al_2O_3$-base glass.

In the present embodiment, the barium titanate having the Ba/Ti molar ratio of 1.000, the specific surface area of $3.3m^2/g$ and the X-ray diffraction angle $2\Theta$ which is split into the peak from (002) plane and the peak from (200) plane at the angle of from 40–50° was used. However, the same effects can be obtained with barium titanate having an X-ray diffraction angle $2\Theta$ split into a peak from (002) plane and a peak from (200) plane at an angle of from 40–50° and a Ba/Ti molar ratio ranging between 1.001 and 1.05 in the dielectric materials

EXAMPLE 3

First, 0.02 mol of $BaCO_3$, 2.5 mol of MgO, 0.2 mol of $MnO_{4/3}$ and 2.1 mol of $BaO$—$SiO_2$—$Al_2O_3$-base glass were added to 100 mol of barium titanate. $Dy_2O_3$ and $Ho_2O_3$ were further added to the mixture in the quantity shown in Table 5. The barium titanate prepared in the same manner as in the example 2 was used.

Next, a multilayer capacitor was made in the same manner as in example 1, except that the thickness of each dielectric layer 1 was made to be 3 μm.

Thereafter, the thus-obtained multilayer capacitor was evaluated in the same manner as in example 1, except that the applied voltage was 64 V in the accelerated life test. The results are shown in Table 6.

As shown in Table 6, even if dielectric layers 10 were made into thin layers each having a thickness of 5 μm or less, by adding 0.1 to 3.0 mol of $Dy_2O_3$ and $Ho_2O_3$ in total so as to have a Dy/(Dy+Ho) molar ratio ranging between 0.3 and 0.9, high insulation resistance was observed. Thus a multilayer capacitor showing no degradation of the insulation resistance in the accelerated life test, and a small rate of capacitance change due to the temperature was obtained.

An explanation for the above is as follows. Although Dy prevents degradation of insulation resistance, a temperature characteristic of the capacitance tends to degrade when dielectric layers 10 are made into the thin layers. Ho improves a temperature characteristic by being added to the dielectric ceramic composition. Accordingly, by adding both Dy and Ho in respective quantities meeting a proper composition, a multilayer capacitor showing a good temperature characteristic of the capacitance and high insulation resistance can be obtained, even if dielectric layers 10 are made into the thin layers.

Here, when the Dy/(Dy+Ho) molar ratio is less than 0.3, the degradation of the insulation resistance is accelerated, while the rate of capacitance change due to the temperature increases when the Dy/(Dy+Ho) molar ratio exceeds 0.9.

Moreover, when the total quantity of $Dy_2O_3$ and $Ho_2O_3$ to be added is less than 0.1 mol, the rate of capacitance change due to the temperature and the tan δ increase. When the total quantity of $Dy_2O_3$ and $Ho_2O_3$ to be added exceeds 3.0 mol, the dielectric constant drops to 2000 or lower, which is not good for practical use. Accordingly, it is preferable that the total quantity of $Dy_2O_3$ and $Ho_2O_3$ ranging from 0.1 to 3.0 mol be added to 100 mol of the barium titanate. It should be noted that when $Dy_2O_3$ and $Ho_2O_3$ each having a specific surface area of from 7 to $15m^2/g$, a spherical shape and a few secondary coagulated particles are used, dispersibility improves, and the effects of the present invention become more noticeable.

EXAMPLE 4

First 0.02 mol of $BaCO_3$, 0.2 mol of $MnO_{4/3}$, 2.1 mol of $BaO$—$SiO_2$—$Al_2O_3$-base glass and 1 mol of $Dy_2O_3$ and $Ho_2O_3$ in total so as to have a Dy/(Dy+Ho) molar ratio of 0.75 were added to 100 mol of barium titanate, and vapor-phase-synthesized $Mg(OH)_2$ was further added thereto in the quantity shown in Table 7. The barium titanate was prepared as in the example 2.

Next, a multilayer capacitor was made under the same conditions as in the example 1 except that the thickness of each dielectric layer 10 was 3 μm.

Thereafter, the thus-obtained multilayer capacitor was evaluated in the same manner as in the example 1, except that the applied voltage was 64 V in the accelerated life test. The results are shown in Table 8.

As shown in Table 8, compared with the case of using MgO, the use of $Mg(OH)_2$ as an Mg compound is effective in further improving a temperature characteristic of the capacitance and preventing degradation of insulation resistance.

This is because vapor phase synthesized $Mg(OH)_2$ is a particle having a spherical shape, and is unlikely to form secondary coagulated bodies, which result in improved dispersibility in the dielectric materials.

Accordingly, even if dielectric layers 10 are made into thin layers each having a thickness of 5 μm or less, a multilayer capacitor showing high insulation resistance, no degradation of the insulation resistance, and a small rate of capacitance change due to the temperature can be obtained.

However, similarly to MgO, when the quantity of $Mg(OH)_2$ to be added is less than 0.5 mol per 100 mol of the barium titanate, dielectric layers 10 do not sinter. When the quantity of $Mg(OH)_2$ to be added exceeds 5.0 mol, the rate of capacitance change due to the temperature increases. Accordingly, it is preferable to add $Mg(OH)_2$ in the range of from 0.5 to 5.0 mol.

EXAMPLE 5

First 0.02 mol of $BaCO_3$, 2.5 mol of MgO, 1.0 mol of $Dy_2O_3$, 0.2 mol of $MnO_{4/3}$ and 2.1 mol of $BaO-SiO_2-Al_2O_3$-base glass were added to 100 mol of the barium titanate used in the example 2, and $Al_2O_3$ was further added thereto in the quantity shown in Table 9 at the time of pulverizing after calcination.

Next, a multilayer capacitor was made in the same manner as in example 1.

Thereafter, thus-obtained multilayer capacitor was evaluated in the same manner as in the example 1. The results are shown in Table 10.

The dielectric ceramic composition of the present invention easily forms a secondary phase. If the secondary phase is formed, there is tendency of degradation of mechanical strength of a multilayer capacitor.

However, as shown in Table 10, the further addition of $Al_2O_3$ can inhibit formation of the secondary phase without degrading properties of the capacitor, thus improving the mechanical strength.

When the quantity of $Al_2O_3$ to be added exceeds 3.0 mol, the rate of capacitance change due to the temperature and a dielectric loss increase, while the effects of addition are not observed when the quantity of $Al_2O_3$ to be added is less than 0.1 mol.

Accordingly, in order to improve mechanical strength without degrading the properties, it is preferable that the quantity of $Al_2O_3$ ranging from 0.1 to 3.0 mol be added to 100 mol of the barium titanate.

It should be noted that $Al_2O_3$ was added after the calcination of other starting materials. $Al_2O_3$ may be added first similarly to the other starting materials: however, it is preferable to add $Al_2O_3$ after the calcination since this process can further improve a temperature characteristic.

The present invention is outlined hereinafter.

(1) In the above-mentioned examples, Si and Al which are among basic components of the dielectric ceramic composition were added as the $BaO-SiO_2-Al_2O_3$-base glass. When adding this glass, 0.3 to 3.5 mol of Si in the form of $SiO_2$ and 0.01 to 3.0 mol of Al in the form of $Al_2O_3$ are added to 100 mol of the barium titanate.

BaO to be added at the same time as Si and Al is mixed in the form of barium titanate or barium carbonate, so that the molar ratio of Ba/Ti in the dielectric material ranges between 1.001 and 1.05.

(2) Though, Si and Al were added as the glass, however, they can be added separately as an Si compound and an Al compound.

(3) $MnO_{4/3}$ was used as an Mn compound since $MnO_{4/3}$ is excellent in dispersibility compared with MnO and the like, and the effects of $MnO_{4/3}$ addition are significant when $MnO_{4/3}$ is added in the same quantity as MnO.

(4) In some of the above-mentioned examples, the barium titanate having the Ba/Ti molar ratio of 1.000 was used: however, a sintered body having more uniform sintered grain diameters can be obtained by using barium titanate whose Ba/Ti molar ratio is adjusted to from 1.001 to 1.006 during synthesis of the barium titanate as a starting material. This composition can enhance the effect of preventing degradation of the insulation resistance in the life test. (5) In the above-mentioned examples, the re-oxidization of the dielectric layers has been carried out in the process of lowering temperature after sintering the laminated body: however, the re-oxidization can be carried out at the time when the sintered laminated body is heat-treated again after being once cooled.

INDUSTRIAL APPLICABILITY

A dielectric ceramic composition of the present invention has excellent reduction-resistant properties. A multilayer capacitor showing high insulation resistance, extremely decreased degradation of the insulation resistance and excellent long-term reliability can be obtained if the dielectric ceramic composition of the present invention is used for a multilayer capacitor whose internal electrodes and external electrodes are formed of base metal. Moreover, the dielectric ceramic composition of the present invention has a high dielectric constant, few variations in capacitance, a small rate of capacitance change due to temperature, and a small rate of capacitance change due to aging.

Moreover, a multilayer capacitor having excellent electric characteristics can be obtained not only in the case where the external electrodes are formed of the base metal such as copper or the like, but similarly also in the case where the external electrodes are formed of noble metal, such as silver or the like.

TABLE 1

| Specimen No. | Ba/Ti Molar Ratio | Specific Surface Area (m²/g) | Split Peaks (200) Plane and (002) Plane |
|---|---|---|---|
| * 1 | 0.999 | 2.5 | Yes |
| 2 | 1.002 | 1.5 | Yes |
| 3 | 1.002 | 2.4 | Yes |
| 4 | 1.002 | 3.0 | Yes |
| 5 | 1.002 | 3.0 | No |
| 6 | 1.002 | 4.3 | Yes |
| 7 | 1.002 | 4.3 | No |
| 8 | 1.002 | 5.3 | Yes |
| 9 | 1.006 | 3.2 | Yes |
| 10 | 1.007 | 2.8 | Yes |
| 11 | 1.020 | 2.8 | Yes |
| 12 | 1.040 | 2.8 | Yes |
| * 13 | 1.050 | 2.8 | Yes |

*: a comparative example.

TABLE 2

| Specimen No. | Dielectric Constant | tan δ (%) | Capacitance Change Rates (%) −55° C. | −25° C. | 85° C. | 125° C. | IR (Ω) | Number of IR Degraded Samples |
|---|---|---|---|---|---|---|---|---|
| * 1 | 2725 | 1.1 | −8.2 | −5.9 | −12.5 | −17.2 | $1.9 \times 10^{10}$ | 3/100 |
| 2 | 3350 | 2.7 | −8.2 | −6.1 | −13.2 | −16.9 | $4.2 \times 10^{12}$ | 0/100 |
| 3 | 3150 | 1.9 | −6.9 | −5.7 | −6.9 | −4.1 | $3.9 \times 10^{12}$ | 0/100 |
| 4 | 2350 | 1.2 | −4.9 | −5.2 | −4.0 | 1.9 | $4.1 \times 10^{12}$ | 0/100 |
| 5 | 3325 | 1.6 | −5.1 | −3.9 | −11.8 | −18.2 | $4.4 \times 10^{12}$ | 0/100 |
| 6 | 2230 | 1.1 | −4.2 | −2.9 | −3.8 | −0.5 | $3.8 \times 10^{12}$ | 0/100 |
| 7 | 3426 | 1.8 | −5.1 | −3.2 | −14.2 | −19.3 | $5.1 \times 10^{12}$ | 0/100 |
| 8 | 1690 | 1.5 | −5.9 | −4.2 | −12.1 | −16.1 | $4.2 \times 10^{12}$ | 0/100 |
| 9 | 2102 | 1.3 | −5.8 | −4.1 | −4.1 | −2.2 | $4.6 \times 10^{12}$ | 0/100 |
| 10 | 2110 | 1.4 | −4.9 | −4.1 | −3.9 | −2.9 | $4.6 \times 10^{12}$ | 0/100 |
| 11 | 2150 | 1.2 | −4.0 | −3.2 | −3.3 | −2.5 | $5.2 \times 10^{12}$ | 0/100 |
| 12 | 2024 | 2.8 | −3.3 | −2.5 | −2.8 | −1.5 | $6.0 \times 10^{12}$ | 0/100 |
| * 13 | | | Did not Sinter | | | | | |

TABLE 3

| Specimen No. | BaCO$_3$ | MgO | Dy$_2$O$_3$ | MnO$_{4/3}$ | BaO—SiO$_2$—Al$_2$O$_3$ | V$_2$O$_5$ |
|---|---|---|---|---|---|---|
| * 14 | 0.02 | 0.4 | 1.5 | 0.2 | 2.1 | 0.15 |
| * 15 | 0.02 | 6 | 0.5 | 0.2 | 2.1 | 0.15 |
| 16 | 0.001 | 0.5 | 1.5 | 0.2 | 2.1 | 0.15 |
| 17 | 0.001 | 5 | 1.5 | 0.2 | 2.1 | 0.15 |
| 18 | 0.04 | 0.5 | 1.5 | 0.2 | 2.1 | 0.15 |
| 19 | 0.04 | 5 | 1.5 | 0.2 | 2.1 | 0.15 |
| * 20 | 0.02 | 2.5 | 0.05 | 0.2 | 2.1 | 0.15 |
| * 21 | 0.02 | 2.5 | 3.5 | 0.2 | 2.1 | 0.15 |
| 22 | 0.001 | 2.5 | 0.1 | 0.2 | 2.1 | 0.15 |
| 23 | 0.001 | 2.5 | 3. | 0.2 | 2.1 | 0.15 |
| 24 | 0.04 | 2.5 | 0.1 | 0.2 | 2.1 | 0.15 |
| 25 | 0.04 | 2.5 | 3 | 0.2 | 2.1 | 0.15 |
| * 26 | 0.02 | 2.5 | 1.5 | 0 | 2.1 | 0.15 |
| * 27 | 0.02 | 2.5 | 1.5 | 0.5 | 2.1 | 0.15 |
| 28 | 0.001 | 2.5 | 1.5 | 0.01 | 2.1 | 0.15 |
| 29 | 0.001 | 2.5 | 1.5 | 0.4 | 2.1 | 0.15 |
| 30 | 0.04 | 2.5 | 1.5 | 0.01 | 2.1 | 0.15 |
| 31 | 0.04 | 2.5 | 1.5 | 0.4 | 2.1 | 0.15 |
| * 32 | 0.02 | 2.5 | 1.5 | 0.2 | 0.5 | 0.15 |
| * 33 | 0.02 | 2.5 | 1.5 | 0.2 | 5.5 | 0.15 |
| 34 | 0.001 | 2.5 | 1.5 | 0.2 | 0.6 | 0.15 |
| 35 | 0.04 | 2.5 | 1.5 | 0.2 | 0.6 | 0.15 |
| 36 | 0.001 | 2.5 | 1.5 | 0.2 | 5 | 0.15 |
| 37 | 0.04 | 2.5 | 1.5 | 0.2 | 5 | 0.15 |
| * 38 | 0.02 | 2.5 | 1.5 | 0.2 | 2.1 | 0 |
| * 39 | 0.02 | 2.5 | 1.5 | 0.2 | 2.1 | 0.3 |
| 40 | 0.02 | 2.5 | 1.5 | 0.2 | 2.1 | 0.15 |
| 41 | 0.02 | 2.5 | 1.5 | 0.2 | 2.1 | 0.01 |
| 42 | 0.02 | 2.5 | 1.5 | 0.2 | 2.1 | 0.26 |

*: a comparative example.

TABLE 4-1

| Specimen No. | Dielectric Constant | tan δ (%) | Capacitance Change Rates (%) −55° C. | −25° C. | 85° C. | 125° C. |
|---|---|---|---|---|---|---|
| * 14 | | | Did not Sinter | | | |
| * 15 | 3411 | 1.19 | −9.7 | −7.3 | −14.3 | −15.9 |
| 16 | 3054 | 1.29 | −10.5 | −3.9 | −0.7 | 8.4 |
| 17 | 3324 | 1.50 | −10.1 | −5.9 | −5.4 | 4.1 |
| 18 | 2582 | 1.20 | −3.9 | −2.7 | −3.3 | 3.8 |
| 19 | 3212 | 1.27 | −5.6 | −3.8 | −3.7 | 3.3 |
| * 20 | 3065 | 2.68 | −15.9 | −11.4 | −12.6 | −15.9 |
| * 21 | 1912 | 1.10 | −3.4 | −2.4 | −3.0 | 3.9 |
| 22 | 3172 | 1.23 | −10.3 | −5.7 | −4.7 | 3.2 |
| 23 | 2572 | 1.21 | −3.9 | −2.4 | −1.7 | 4.9 |
| 24 | 3059 | 1.94 | −7.2 | −5.1 | −3.7 | 2.9 |
| 25 | 2415 | 1.06 | −3.9 | −2.7 | −1.3 | 3.9 |
| * 26 | 2829 | 1.59 | −5.1 | −3.2 | −1.8 | 4.2 |
| * 27 | 2472 | 0.97 | −6.1 | −5.3 | −11.4 | −16.9 |
| 28 | 2797 | 1.42 | −4.4 | −2.9 | −2.1 | 4.8 |
| 29 | 2572 | 0.96 | −5.6 | −4.5 | −8.8 | −13.5 |
| 30 | 2567 | 1.51 | −3.5 | −2.3 | −1.7 | 5.5 |
| 31 | 2548 | 1.01 | −5.1 | −3.9 | −7.8 | −12.1 |
| * 32 | | | Did not Sinter | | | |
| * 33 | 1812 | 1.10 | −15.8 | −11.3 | −12.4 | −17.2 |
| 34 | 3471 | 1.59 | −12.2 | −6.1 | −2.3 | 3.2 |
| 35 | 3084 | 1.07 | −11.0 | −4.5 | −2.0 | 3.7 |
| 36 | 2332 | 1.12 | −7.1 | −4.7 | −3.5 | 2.9 |
| 37 | 2271 | 1.03 | −6.6 | −3.2 | −2.5 | 3.9 |
| * 38 | 2782 | 1.09 | −4.0 | −2.4 | −0.9 | 5.5 |
| * 39 | 2647 | 1.10 | −7.8 | −4.1 | −10.2 | −15.7 |
| 40 | 2952 | 1.29 | −4.9 | −3.0 | −7.6 | −9.2 |
| 41 | 2781 | 1.09 | −4.5 | −2.8 | −2.4 | 4.2 |
| 42 | 2710 | 1.05 | −5.0 | −2.3 | −7.1 | −8.8 |

*: a comparative example

TABLE 4-2

| Specimen No. | IR (Ω) | Number of IR Degraded Samples |
|---|---|---|
| * 14 | | Did not Sinter |
| * 15 | $2.1 \times 10^{12}$ | 0/100 |
| 16 | $2.2 \times 10^{12}$ | 0/100 |
| 17 | $3.2 \times 10^{12}$ | 0/100 |
| 18 | $3.1 \times 10^{12}$ | 0/100 |
| 19 | $3.3 \times 10^{12}$ | 0/100 |
| * 20 | $2.7 \times 10^{12}$ | 0/100 |
| * 21 | $3.3 \times 10^{12}$ | 0/100 |
| 22 | $1.9 \times 10^{12}$ | 0/100 |
| 23 | $3.2 \times 10^{12}$ | 0/100 |
| 24 | $3.4 \times 10^{12}$ | 0/100 |
| 25 | $2.8 \times 10^{12}$ | 0/100 |
| * 26 | $5.0 \times 10^{8}$ | 5/100 |
| * 27 | $2.4 \times 10^{12}$ | 4/100 |
| 28 | $1.8 \times 10^{12}$ | 0/100 |
| 29 | $4.3 \times 10^{12}$ | 0/100 |
| 30 | $2.6 \times 10^{12}$ | 0/100 |
| 31 | $3.3 \times 10^{12}$ | 0/100 |
| * 32 | | Did not Sinter |
| * 33 | $3.2 \times 10^{12}$ | 0/100 |
| 34 | $2.7 \times 10^{12}$ | 0/100 |

TABLE 4-2-continued

| | Specimen No. | IR (Ω) | Number of IR Degraded Samples |
|---|---|---|---|
| | 35 | $4.6 \times 10^{12}$ | 0/100 |
| | 36 | $2.1 \times 10^{12}$ | 0/100 |
| | 37 | $2.9 \times 10^{12}$ | 0/100 |
| * | 38 | $5.0 \times 10^{8}$ | 2/100 |
| * | 39 | $3.8 \times 10^{10}$ | 0/100 |
| | 40 | $2.4 \times 10^{12}$ | 0/100 |
| | 41 | $3.2 \times 10^{12}$ | 0/100 |
| | 42 | $3.4 \times 10^{12}$ | 0/100 |

*: a comparative example.

TABLE 5

| | Specimen No. | Dy/(Dy + Ho) | Quantity of (Dy + Ho) to be Added (mol) |
|---|---|---|---|
| * | 43 | 0.25 | 1.5 |
| | 44 | 0.3 | 1.5 |
| | 45 | 0.45 | 1.5 |
| | 46 | 0.9 | 1.5 |
| * | 47 | 0.95 | 1.5 |
| * | 48 | 0.45 | 0.05 |
| * | 49 | 0.45 | 3 |

*: a comparative example.

TABLE 6

| | Specimen No. | Dielectric Constant | tan δ (%) | Capacitance Change Rates (%) −55° C. | −25° C. | 85° C. | 125° C. | IR (Ω) | Number of IR Degraded Samples |
|---|---|---|---|---|---|---|---|---|---|
| * | 43 | 2365 | 1.8 | −3.9 | −3.1 | −5.7 | −6.5 | $1.9 \times 10^{12}$ | 2/100 |
| | 44 | 2325 | 1.7 | −4.5 | −4.1 | −6.2 | −7.2 | $2.7 \times 10^{12}$ | 0/100 |
| | 45 | 2286 | 1.7 | −4.8 | −3.9 | −6.8 | −8.2 | $4.2 \times 10^{12}$ | 0/100 |
| | 46 | 2187 | 1.8 | −5.3 | −4.3 | −7.3 | −11.2 | $3.9 \times 10^{12}$ | 0/100 |
| * | 47 | 2076 | 1.6 | −5.8 | −5.1 | −11.2 | −15.9 | $4.1 \times 10^{12}$ | 0/100 |
| * | 48 | 3129 | 2.7 | −12.7 | −3.9 | −11.8 | −18.2 | $4.4 \times 10^{12}$ | 0/100 |
| * | 49 | 1725 | 1.4 | −4.2 | −2.9 | −3.8 | −0.5 | $3.8 \times 10^{12}$ | 0/100 |

*: a comparative example.

TABLE 7

| | Specimen No. | Mg Compound | Quantity to be Added (mol) |
|---|---|---|---|
| | 50 | MgO | 2.5 |
| | 51 | Mg(OH)$_2$ | 2.5 |
| * | 52 | Mg(OH)$_2$ | 0.4 |
| * | 53 | Mg(OH)$_2$ | 6 |

*: a comparative example.

TABLE 8

| | Specimen No. | Dielectric Constant | tan δ (%) | Capacitance Change Rates (%) −55° C. | −25° C. | 85° C. | 125° C. | IR (Ω) |
|---|---|---|---|---|---|---|---|---|
| | 50 | 2300 | 1.8 | −5.0 | −4.1 | −7.0 | −9.0 | $1.9 \times 10^{12}$ |
| | 51 | 2295 | 1.7 | −3.1 | −2.8 | −3.9 | −5.9 | $2.7 \times 10^{12}$ |
| * | 52 | | | Did not Sinter | | | | |
| * | 53 | 3159 | 1.8 | −9.7 | −8.8 | −13.2 | −16.3 | $3.9 \times 10^{12}$ |

*: a comparative example.

TABLE 9

| | Specimen No. | Quantity of Al$_2$O$_3$ to be Added (mol) |
|---|---|---|
| * | 54 | 0 |
| * | 55 | 3.5 |
| | 56 | 0.1 |
| | 57 | 3 |

*: a comparative example.

TABLE 10

| Specimen No. | Dielectric Constant | tan δ (%) | Capacitance Change Rates (%) | | | | IR(Ω) |
|---|---|---|---|---|---|---|---|
| | | | −55° C. | −25° C. | 85° C. | 125° C. | |
| * 54 | 2300 | 1.8 | −5.0 | −4.1 | −7.0 | −9.0 | $1.9 \times 10^{12}$ |
| * 55 | 2363 | 2.78 | −5.8 | −4.3 | −11.1 | −15.9 | $3.5 \times 10^{12}$ |
| 56 | 2788 | 2.01 | −4.1 | −2.8 | −3.0 | 4.2 | $2.5 \times 10^{12}$ |
| 57 | 2471 | 1.17 | −4.3 | −3.0 | −8.5 | −9.5 | $2.3 \times 10^{12}$ |

*: a comparative example

What is claimed is:

1. A dielectric ceramic composition comprising:

barium titanate as a main component having Ba/Ti molar ratio ranging between 1.001 and 1.05; and sub components comprising, at least 0.5 to 5.0 mol of Mg in the form of MgO, 0.1 to 3.0 mol of Dy in the form of $Dy_2O_3$, 0.01 to 0.4 mol of Mn in the form of $Mn_3O_4$, 0.01 to 0.26 mol of V in the form of $V_2O_5$, 0.3 to 3.5 mol of Si in the form of $SiO_2$ and 0.01 to 3.0 mol of Al in the form of $Al_2O_3$ per 100 mol of the barium titanate.

2. The dielectric ceramic composition as defined in claim 1, further comprising 0.1 to 3.0 mol of Al in the form of $Al_2O_3$ per 100 mol of the barium titanate.

3. The dielectric ceramic composition as defined in claim 1, comprising, in place of Dy, 0.1 to 3.0 mol of Dy and Ho in total in the form of $Dy_2O_3$ and $Ho_2O_3$, respectively so as to have a Dy/(Dy+Ho) molar ratio ranging between 0.3 and 0.9.

4. A capacitor comprising:

a laminated body of which dielectric layers and internal electrode layers made of base metal alternately stacked; and an external electrode provided at exposed end faces of the internal electrode layers of the laminated body, wherein the dielectric layer comprising;

barium titanate as a main component having Ba/Ti molar ratio ranging between 1.001 and 1.05; and sub components comprising, at least 0.5 to 5.0 mol of Mg in the form of MgO, 0.1 to 3.0 mol of Dy in the form of $Dy_2O_3$, 0.01 to 0.4 mol of Mn in the form of $Mn_3O_4$, 0.01 to 0.26 mol of V in the form of $V_2O_5$, 0.3 to 3.5 mol of Si in the form of $SiO_2$ and 0.01 to 3.0 mol of Al in the form of $Al_2O_3$ per 100 mol of the barium titanate.

5. The capacitor as defined in claim 4, wherein the sub components of the dielectric layers further comprises 0.1 to 3.0 mol of Al in the form of $A_2O_3$ per 100 mol of the barium titanate.

6. The capacitor as defined in claim 4, comprising in place of Dy 0.1 to 3.0 mol of Dy and Ho in total in the form of $Dy_2O_3$ and $Ho_2O_3$ respectively so as to have a Dy/(Dy+Ho) molar ratio ranging between 0.3 and 0.9 per 100 mol of the barium titanate, the main component.

7. A method of manufacturing a capacitor comprising the steps of:

preparing ceramic sheets with dielectric materials comprising;

barium titanate as a main component having Ba/Ti molar ratio ranging between 1.001 and 1.05; and sub components comprising, at least 0.5 to 5.0 mol of Mg in the form of MgO, 0.1 to 3.0 mol of Dy in the form of $Dy_2O_3$, 0.01 to 0.4 mol of Mn in the form of $Mn_3O_4$, 0.01 to 0.26 mol of V in the form of $V_2O_5$, 0.3 to 3.5 mol of Si in the form of $SiO_2$ and 0.01 to 3.0 mol of Al in the form of $Al_2O_3$ per 100 mol of the barium titanate;

making a laminated body of which the ceramic sheets and internal electrode layers mainly composed of base metal alternately stacked;

sintering the laminated body; and forming an external electrode at exposed end faces of the internal electrode layers of the laminated body.

8. The method of manufacturing capacitor as defined in claim 7, wherein the external electrode is formed of metal mainly composed of copper.

9. The method of manufacturing capacitor as defined in claim 7, wherein a specific surface area of the barium titanate ranges from 2 to 5 $m^2$/g.

10. The method of manufacturing capacitor as defined in claim 7, wherein an X-ray diffraction angle 2Θ of the barium titanate is split into a diffraction peak derived from (200) plane and a diffraction peak derived from (002) plane at an angle of from 40° to 50°.

11. The method of manufacturing capacitor as defined in claim 7, wherein $Mg(OH)_2$ is used as the Mg compound.

12. The method of manufacturing capacitor as defined in claim 7, wherein, 0.1 to 3.0 mol of an Al compound in the form of $Al_2O_3$ per 100 mol of the barium titanate is further added in the ceramic sheet preparing step.

13. The method of manufacturing capacitor as defined in claim 12, wherein the Al compound is added after calcination of the other dielectric materials.

14. The method of manufacturing capacitor as defined in claim 7, wherein the dielectric materials comprises, in place of the Dy compound, 0.1 to 3.0 mol of the Dy compound and an Ho compound in total in the form of $Dy_2O_3$ and $Ho_2O_3$ respectively so as to have a Dy/(Dy+Ho) molar ratio ranging between 0.3 and 0.9 per 100 mol of the barium titanate , the main component.

15. The method of manufacturing capacitor as defined in claim 7, wherein a step of re-oxidizing the dielectric layers in the laminated body is included in a temperature lowering step in the sintering process or between the sintering step and the external electrode forming step.

* * * * *